(12) United States Patent
Gao et al.

(10) Patent No.: US 11,423,694 B2
(45) Date of Patent: Aug. 23, 2022

(54) METHODS AND SYSTEMS FOR DYNAMIC AND INCREMENTAL FACE RECOGNITION

(71) Applicant: Samsung Electronics Company, Ltd., Suwon-si (KR)

(72) Inventors: Jiang Gao, Mountain View, CA (US); Xinyao Wang, Mountain View, CA (US); Gene Becker, Mountain View, CA (US)

(73) Assignee: Samsung Electronics Company, Ltd.

( * ) Notice: Subject to any disclaimer, the term of this patent is extended or adjusted under 35 U.S.C. 154(b) by 109 days.

(21) Appl. No.: 16/812,101

(22) Filed: Mar. 6, 2020

(65) Prior Publication Data

US 2020/0401791 A1    Dec. 24, 2020

Related U.S. Application Data

(60) Provisional application No. 62/884,829, filed on Aug. 9, 2019, provisional application No. 62/863,669, filed on Jun. 19, 2019.

(51) Int. Cl.
*G06V 40/16* (2022.01)
*G06N 20/00* (2019.01)
*G06V 20/30* (2022.01)

(52) U.S. Cl.
CPC .......... *G06V 40/166* (2022.01); *G06N 20/00* (2019.01); *G06V 20/30* (2022.01); *G06V 40/173* (2022.01)

(58) Field of Classification Search
CPC .......... G06K 9/00255; G06K 9/00677; G06K 9/00295; G06K 9/72; G06K 9/6269; G06K 9/00288; G06K 9/00228; G06K 9/00892; G06K 9/00281; G06K 9/00221; G06K 9/00268; G06K 9/00899; G06K 9/6293; G06K 9/00208; G06K 2209/01; G06K 9/6201; G06K 9/00114; G06K 9/6232; G06K 9/6262; G06K 9/68; G06K 9/00906; G06K 9/66; G06K 9/00624; G06K 9/00791; G06K 9/00302; G06K 2009/00939; G06K 9/00335; G06K 9/00597; G06K 9/3233; G06K 9/00456; G06K 9/2063; G06K 9/4671; G06N 20/00; G06N 3/08; G06N 3/04; G06F 21/32; G06F 21/31;
(Continued)

(56) References Cited

U.S. PATENT DOCUMENTS 9,176,987 B1    11/2015 Peng
2004/0264780 A1  12/2004 Lei
(Continued)

FOREIGN PATENT DOCUMENTS

KR    10-2018-0105636 A    9/2018

OTHER PUBLICATIONS

International Search Report and Written Opinion for International Application No. PCT/KR2020/006711, dated Sep. 1, 2020.
(Continued)

*Primary Examiner* — Nimesh Patel

(57) ABSTRACT

In one embodiment, a method includes identifying a facial image from an image of a scene. The method then determines a context associated with the facial image based on a context model. The method then identifies a person from a database based on the context and a facial recognition model associated with the facial image.

20 Claims, 7 Drawing Sheets

(58) Field of Classification Search
CPC ............. G06F 21/36; G06F 2221/2129; G06F 2221/2117; G06F 21/35; G06F 2221/2103; G06F 21/316; G06F 21/53; G06F 2221/2113; H04L 63/0861; H04L 63/102; H04L 63/10; H04L 9/3231; H04L 63/105; H04L 2463/082; H04L 9/3271; H04L 63/08; H04L 63/107; H04L 63/0853; H04L 2463/102; H04L 63/108; G06Q 20/40145; G06Q 20/3829; G06Q 20/4012; G06Q 50/265; G06Q 20/382; G06Q 20/32; G06Q 20/351; G06Q 20/401; H04W 12/06; H04W 12/065; H04W 12/08; H04W 4/027; H04W 88/02; H04W 12/67; H04W 12/12; H04W 12/68; H04W 12/122; H04W 12/37; H04W 12/40; G07C 9/37; G07C 9/38; G07C 9/00563; G07C 9/00571; G07C 9/00; G07C 9/22; G07C 9/26; G07C 9/27; G07C 9/30; G07C 9/25; B60R 2325/106; B60R 2325/205; B60R 25/241; B60R 25/25; G06V 40/166; G06V 20/30; G06V 40/173; G06V 10/768; G06V 10/774; G06V 40/172

See application file for complete search history.

(56) References Cited

U.S. PATENT DOCUMENTS

| | | |
|---|---|---|
| 2007/0003113 A1 | 1/2007 | Goldberg |
| 2010/0310134 A1 | 12/2010 | Kapoor |
| 2011/0222724 A1* | 9/2011 | Yang .................... G06K 9/4628 382/103 |
| 2017/0017834 A1 | 1/2017 | Ruslan |
| 2018/0060673 A1 | 3/2018 | Quanfu |
| 2018/0060680 A1* | 3/2018 | Alon ....................... G06F 21/32 |

OTHER PUBLICATIONS

V. Kaushal, R. Iyer, S. Kothawade, R. Mahadev, K. Doctor and G. Ramakrishnan, "Learning From Less Data: A Unified Data Subset Selection and Active Learning Framework for Computer Vision," 2019 IEEE Winter Conference on Applications of Computer Vision (WACV), 2019, pp. 1289-1299, doi: 10.1109AVACV.2019.00142, 2019.

Extended European Search Report re application No. 20826170,1, dated Mar. 18, 2022.

* cited by examiner

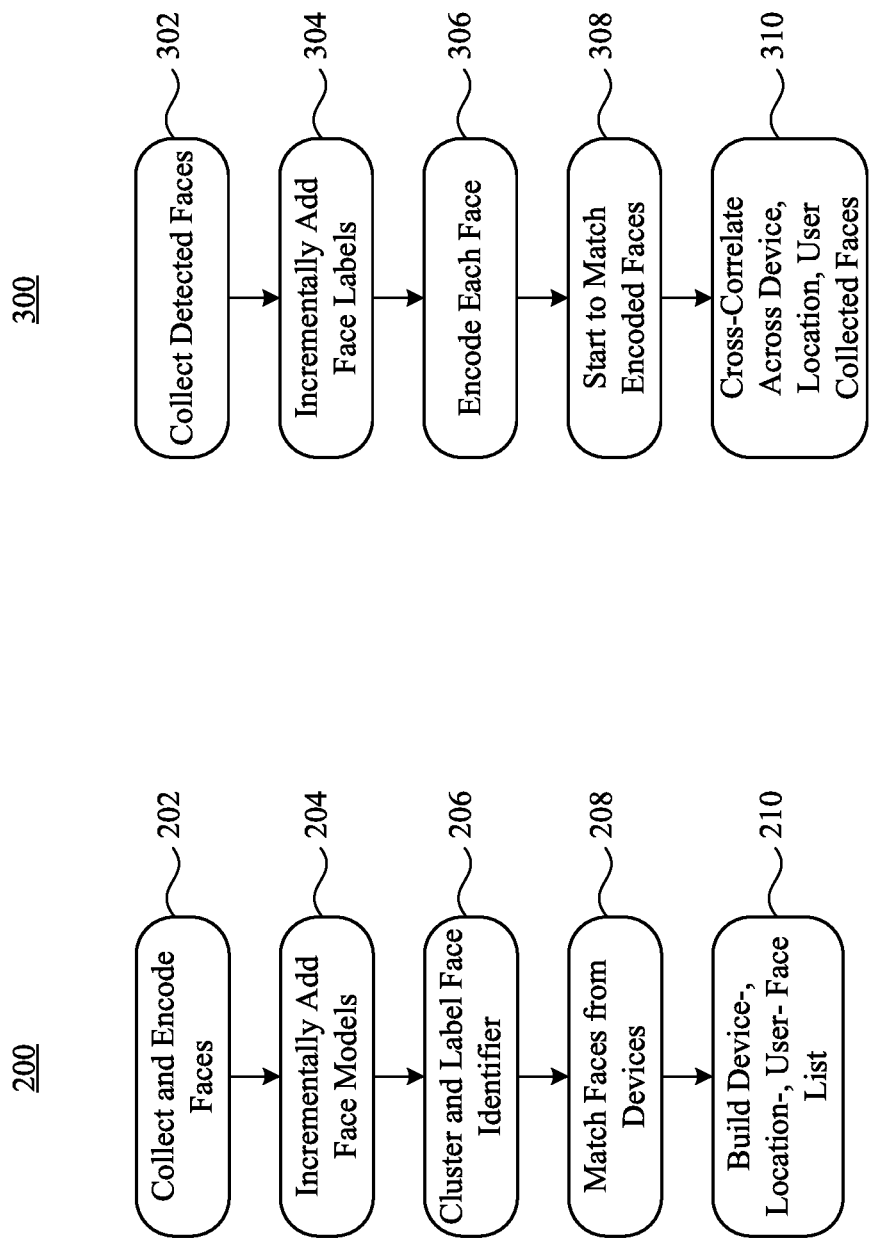

METHODS AND SYSTEMS FOR DYNAMIC AND INCREMENTAL FACE RECOGNITION

PRIORITY

This application claims priority under 35 U.S.C. § 119 to provisional patent application No. 62/863,669, which is incorporated by reference herein. This application also claims priority under 35 U.S.C. § 119 to provisional patent application No. 62/884,829, which is incorporated by reference herein

TECHNICAL FIELD

This disclosure generally relates to facial recognition.

BACKGROUND

Existing facial recognition systems generally may require an initial labeling of user faces and may suffer from a cold start issue without such initial labeling. Additionally, a user's face appearance may have variations depending on different situations, such as lighting changes, makeup, glasses/no glasses, new hairstyle, or just aging. Therefore, initial labeling may quickly become insufficient for reliably recognizing users, and existing users may incorrectly be identified as a new face. In addition, for scenarios, such as implementation within a home security application, the application may need to generate an alarm for unfamiliar faces, and insufficient recognition of existing users can cause false alarms.

BRIEF DESCRIPTION OF THE DRAWINGS

FIG. 2 illustrates an example flowchart of dynamic facial model collection.

FIG. 3 illustrates an example flowchart of dynamic facial model building.

DESCRIPTION OF EXAMPLE EMBODIMENTS

Figure 1:
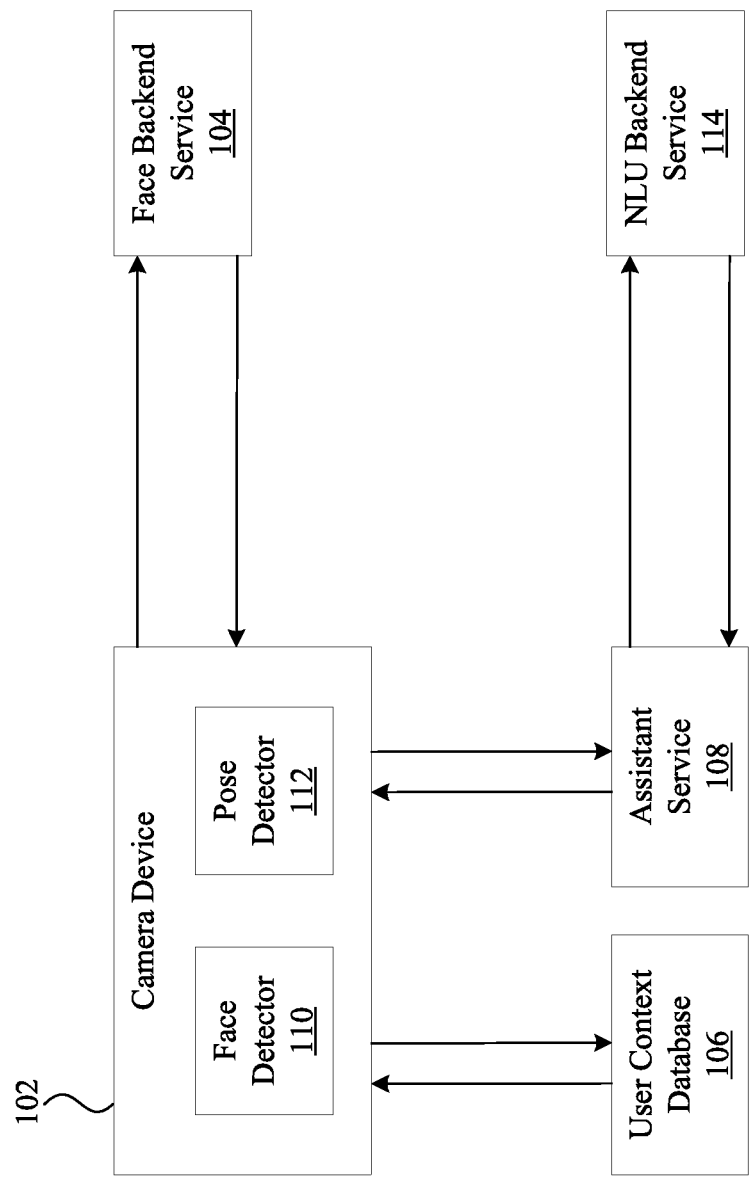
FIG. 1 illustrates an example facial recognition system.

An electronic device of the present disclosure offers the ability to capture and organize personal identities associated with facial images. For example, the electronic device may include a camera using computer vision to analyze streaming data from a video captured by the camera. Using the camera and computer vision, the device may be able to dynamically collect facial images and incrementally build facial recognition models. The device may build out the facial recognition model without any initial facial image samples and/or data. The device may be connected to a server (e.g., the cloud) and can dynamically organize facial recognition models and correlate them across multiple devices, locations, users, or other contexts. The device may implement active learning to reduce the need for initial and incremental user labeling of face data. Users interfacing the device may use multimodal interaction, such as voice, touch, or gesture.

In particular embodiments, a facial recognition model may associate a particular face with an identity for that face. The facial recognition model may be based on a cluster of face samples, such as facial images (e.g., from different angles or in different settings) of the particular face. A facial recognition model may be based on user-supplied information, such as a user-supplied label (e.g., "Jim" or "mail carrier") for the identity associated with the particular face. As explained below, the identity and/or the facial recognition model may be temporary or persistent data in a database. An existing facial recognition model may be updated with additional information, for example with additional facial samples of the individual, additional user-supplied or machine-generated labels (e.g., a last name) for the identity, and/or with contextual information.

In building out a facial recognition model, the electronic device may determine a context associated with facial image samples that are captured by the camera. Additionally, the device may identify various semantic levels of information of a scene and the elements within the scene. For example, within a captured sequence of images, the device may determine two people captured within an image are playing with a ball, the ball being a football, the image is captured during the afternoon, and the like. The various semantic levels of information of the scene captured within the image may provide further information corresponding to the context in which image was captured. Furthermore, the information may also provide a context in which a facial image is captured. In particular embodiments, the scene comprises scene parameters, where the scene parameters include one or more of a time, a date, one or more elements captured within an image, or an activity.

The electronic device may establish character models and/or user context models for identified people within a scene. The device may build out an overall representative structure of data representing a specific character within a scene and across multiple scenes. The device may establish a time varying co-appearance graph based on these character models/user context models representative of an individual character/person. The time varying co-appearance graph may indicate the relationships between two or more individuals. The device may leverage these user context models to more accurately identify a person within a scene. For example, if two children typically play in the living room area during the afternoon, then the device may more accurately label two people identified within an image captured in the afternoon as the two children if certain items are detected, such as toys that have been previously detected in prior images captured with the two children. While this disclosure describes an electronic device that performs the functions described above, this disclosure contemplates that in some embodiments such functionality may be performed by multiple devices, such as devices in a server-client architecture.

FIG. 1 illustrates an example facial recognition system 100. The facial recognition system 100 may comprise a camera device 102, a face backend service 104, a user context database 106, an assistant service 108, and a natural-language understanding (NLU) backend service 114. The camera device 102 may comprise a face detector 110 and a pose detector 112. The camera device 102 may be connected to a network to wirelessly communicate with the face backend service 104, the user context database 106, and/or the assistant service 108. In particular embodiments, one or more of the components 102, 104, 106, 108, 114 of the facial recognition system 100 may be combined with other components 102, 104, 106, 108, 114 of the facial recognition system 100. As an example and not by way of limitation, the user context database 106 may be stored on the camera device 102. While only a certain number of components 102, 104, 106, 108, 114 of the facial recognition system 100 is shown, there may be any number of components 102, 104, 106, 108, 114 and/or combinations of the components 102, 104, 106, 108, 114. As an example and not by way of limitation, there may be two camera devices 102 in the facial recognition system 100. In particular embodiments, each of the components 102, 104, 106, 108, 114 may be wirelessly coupled with each other through a network.

In particular embodiments, the camera device 102 may be an electronic device including hardware, software, or embedded logic components or a combination of two or more such components and capable of carrying out the appropriate functionalities implemented or supported by a camera device 102. As an example and not by way of limitation, a camera device 102 may include a computer system such as a desktop computer, notebook or laptop computer, netbook, a tablet computer, e-book reader, GPS device, camera, personal digital assistant (PDA), handheld electronic device, cellular telephone, smartphone, smart speaker, other suitable electronic device, a camera system, or any suitable combination thereof. In particular embodiments, the camera device 102 may be a computer system coupled to a camera. The camera device 102 may capture streaming data. As an example and not by way of limitation, the camera device 102 may capture a plurality of images in a sequence, such as a video. The camera device 102 may use a face detector 110 to identify facial images within the captured images. In particular embodiments, the camera device 102 may access a facial image from the streaming data. In particular embodiments, the camera device 102 may use a facial recognition model (that may be embodied by the face detector 110) to identify a facial image from an image of a scene.

The camera device 102 may use a pose detector 112 to determine a pose of the facial images in the captured images. As an example and not by way of limitation, the camera device 102 may capture an image and identify a face within the image at a particular position and orientation. In particular embodiments, the camera device 102 may not include a pose detector 112 and may user another device to detect the pose or not detect the pose at all. A user may interface with the camera device 102. In particular embodiments, the camera device 102 may comprise a user interface, such as a touch-screen display. The camera device 102 may send facial images to the face backend service 104. The camera device 102 may determine a context associated with captured images as described herein. As an example and not by way of limitation, the camera device 102 may analyze an image to identify an activity being conducted by people identified within the image. The camera device 102 may upload the context and user data to the user context database 106. The camera device 102 may also upload interaction data to the user context database 106. The interaction data may be indicative of a determination of two or more people identified within a captured image. As an example and not by way of limitation, two people live in a house together and generally watch television together. To accurately link a facial image to a context, the camera device 102 may use a face identifier received from the face backend service 104 to associate with the facial image. The camera device 102 may then upload the context with the face identifier to the user context database to create the association between a person identified by the face identifier to a particular context (e.g., a user regularly comes home at 5 PM every weekday).

The camera device 102 may request user data from the user context database 106. The user data may comprise one or more contexts associated with one particular individual. As an example and not by way of limitation, there may be only one individual who plays an instrument within the total captured images by the camera device 102. The camera device 102 may send the user data to the face backend service 104. The user data may be associated with a corresponding facial recognition model. In particular embodiments, the camera device 102 may identify a person in a captured image using the received user data from the user context database 106 and the facial image. As an example and not by way of limitation, if the only musician in a household is Sam, which is identified from the user data, then based on a facial image (which may be determined by the facial recognition model as Sam with 70% confidence/matching score) and the user data, a person playing an instrument within a captured image may be identified as Sam. The discrepancy with not a total match by the facial recognition model may be due to one or more objects occluding a person's face and/or variances of the person's face. The camera device 102 may send queries to the assistant service 108. The assistant service 108 may return a response to the query.

In particular embodiments, the face backend service 104 may include one or more types of servers, one or more data stores, one or more interfaces, including but not limited to APIs, one or more web services, one or more content sources, one or more networks, or any other suitable components, e.g., that servers may communicate with. The face backend service 104 may be used to identify a face identifier corresponding to facial images captured by the camera device 102. In particular embodiments, the face backend service 104 may comprise a plurality of facial recognition models. Each of the facial recognition models may be used to identify a particular person based on facial image data. In particular embodiments, the face backend service 104 may determine a facial match score by applying each of a plurality of facial recognition models to the facial images.

In particular embodiments, the face backend service 104 may determine the least distance between the facial images and one or more facial recognition models and select to use the facial recognition models with the least distance. After determining a facial match score between the facial image captured by the camera device 102 and the one or more facial recognition models, the face backend service 104 may select one of the facial recognition models based on the facial match scores. The face backend service may identify the face identifier associated with the selected facial recognition model. The face backend service 104 may send back the face identifier corresponding to the selected facial recognition model and the received facial image from the camera device 102. The face backend service 104 may also request user confirmation from the camera device 102. The user confirmation may be a confirmation of an accurate labeling of a facial image. As an example and not by way of limitation, the user confirmation may be to confirm an unfamiliar person is captured within an image. As another example and not by way of limitation, the user confirmation may be to confirm a familiar person is captured within an image. The face backend service 104 may receive face confirmation data from the user via the camera device 102 in response to the request.

In particular embodiments, the user context database 106 may include one or more types of servers, one or more data stores, one or more interfaces, including but not limited to APIs, one or more web services, one or more content sources, one or more networks, or any other suitable components, e.g., that servers may communicate with. The user context database 106 may comprise a plurality of user data for each identified individual. The user data may comprise context information associated with an individual as described herein. The user context database 106 may be updated by the camera device 102 and/or multiple camera devices 102 through a plurality of uploads.

In particular embodiments, the assistant service 108 may include one or more types of servers, one or more data stores, one or more interfaces, including but not limited to APIs, one or more web services, one or more content sources, one or more networks, or any other suitable components, e.g., that servers may communicate with. The assistant service 108 may communicate with the NLU backend service 114. When the assistant service 108 receives a query from the camera device 102, such as a user input, the assistant service 108 may send the user input to the NLU backend service 114 to identify a query associated with the user input. The assistant service 108 may query other databases to generate a response to the query and return a response to the camera device 102. The camera device may present the information associated with the response to the user. As an example and not by way of limitation, if a user sends a user input, "what's the weather today?" to the assistant service 108 through the camera device 102, then the assistant service 108 may identify the query associated with the user input through NLU backend service 114 and generate a response to send to the camera device 102 to display to the user.

In particular embodiments, the facial recognition system 100 may receive input from a streaming source, such as video frames in a continuous manner. The video frames may be received via the camera device 102. In particular embodiments, a face sample pool is maintained by the facial recognition system 100 to find a match to incoming facial images. Classifiers may be trained based on the face sample pool to classify faces. The facial recognition system 100 may initially start from an empty pool of face samples. The facial recognition system 100 may determine which new facial image to select from the video frames to add to the face sample pool. To make the determination, the facial recognition system 100 may determine a matching error exceeds a threshold with respect to existing facial recognition models and/or the existing facial recognition models fail to identify an individual associated with the facial image. In particular embodiments, the facial recognition system 100 may generate a new facial recognition model using the new facial image that has a matching error that exceeds a threshold with respect to existing facial recognition models. In particular embodiments, the facial recognition system 100 may use a clustering algorithm, which may structure the pool of face samples as multiple groups of face samples for multiple face identities. Each group may correspond to a different face identifier. As an example and not by way of limitation, for face samples of a man with a beard, the facial recognition system 100 may generate a group or cluster of face samples of the man with the beard under a first face identifier. The facial recognition system 100 may then take face samples of a woman with long hair and generate a group or cluster of face samples of the woman with long hair under a second face identifier.

In particular embodiments, the facial recognition system 100 may be coupled or wirelessly coupled to a home security system. The home security system and/or the facial recognition system 100 may be coupled to a plurality of devices to capture streaming data. The streaming data may be sent to the facial recognition system 100 to be analyzed as described herein. The home security system may send unfamiliar face notifications to users in response to identifying a person as an unfamiliar person. To do so, the facial recognition system 100 would access a facial image from streaming data and apply a plurality of facial recognition models to the facial image to determine whether there is a match. In response to determining there is no match, the facial recognition system 100 may send an alert to the home security system, which would send an unfamiliar face notification to the user. In particular embodiments, the facial recognition system 100 and/or the home security system may identify several common occurrences of unfamiliar faces that may need to be excluded. As an example and not by way of limitation, a mailman may come by the door daily and may not need to be labeled as an unfamiliar face. In particular embodiments, the facial recognition system 100 may incorporate frequency of detection as another trigger mechanism. As an example and not by way of limitation, only an identification of an unfamiliar person for a threshold time period may trigger an unfamiliar face notification to the user. As another example and not by way of limitation, if a mailman frequently comes by the front door for a short duration, then the mailman may not trigger an unfamiliar face notification.

FIG. 2 illustrates an example flowchart of dynamic facial model collection. The process 200 may begin with step 202, where a facial recognition system may collect facial images and encode the facial images that are collected. To collect facial images, the facial recognition system may use a camera to capture a plurality of images and apply a face detector on the plurality of images to identify facial images within the plurality of images. These facial images may be added to a pool of face samples. At step 204, the facial recognition system may incrementally add face models for each of the facial images. To do so, the facial recognition system may first match each of the facial images with the existing pool of face samples. The facial recognition system may use a distance from clusters of face samples to determine if each new facial image belongs to one of the existing face identifiers. The facial recognition system may assign a temporary face identifier to each of the facial images that does not fall into one of the clusters of face samples with an existing face identifier.

At step 206, the facial recognition system may cluster facial images with temporary face identifiers together and add a face identifier to the cluster of facial images. As an example and not by way of limitation, the facial recognition system may identify a woman with short hair in multiple facial images in the pool of face samples and cluster the facial images together and add a face identifier to the cluster. At step 208, the facial recognition system may match the facial images from other devices. As an example and not by way of limitation, if a bearded man is identified in the living room area of his house by one device and the bearded man is identified in the kitchen area of his house by another device, then the facial recognition system may determine that both instances of the bearded man identified by two separate devices may be the same person and match the facial images from each of the devices. For instance, by using a backend service and/or a database, the facial recognition models from multiple devices may be cross examined to achieve optimal results, such as accurately identifying a person. At step 210, the facial recognition system may build a device-specific facial list, a location-specific facial list, and a user-specific facial list. The device-specific facial list may be a list of face identifiers associated with the device. The location-specific facial list may be associated with multiple devices and be a list of face identifiers associated with a location. That is, the face identifiers are associated with facial images captured within a location by devices at the location. The user-specific facial list may comprise facial images associated with a particular user or a particular face identifier.

FIG. 3 illustrates an example flowchart of dynamic facial model building. The process 300 may begin with step 302, where a facial recognition system may collect facial images. At step 304, the facial recognition system may incrementally add face labels to the facial images. At step 306, the facial recognition system may encode each facial image. At step 308, the facial recognition system may match the encoded facial images. The facial recognition system may match each of the detected facial images to an existing pool of face samples. The facial recognition system may use a distance from clusters of face samples to determine if each encoded facial image belongs to one of the existing face identifiers. The facial recognition system may assign a temporary face identifier to each of the facial images that does not fall into one of the clusters of face samples with an existing face identifier. At step 310, the facial recognition system may cross-correlate the facial images across multiple devices, locations, and user-collected facial images. By cross-correlating, the face identifiers may be combined to identify a particular individual through the facial images.

In particular embodiments, the active learning algorithm, which may be implemented by the facial recognition system, may select multiple face samples from the pool of face samples to query the user based on the distance from clusters of face samples. As an example and not by way of limitation, if a new facial image is received and the active learning algorithm determines that the distance between the new facial image and the clusters of face samples is greater than a threshold distance, then the active learning algorithm may select the new facial image to query the user. A query to the user may be a request to confirm whether the new facial image belongs to the same clusters of face samples or not. The user may interact with the query to confirm the new facial image belongs to a same cluster or it is separate from the cluster. In particular embodiments, if the user confirms that a new facial image does not belong to existing clusters of face samples, then the new facial image becomes a sample of an unfamiliar face cluster. The detection of unfamiliar faces may be based on matching with existing facial recognition models or depend on user feedback. In particular embodiments, a facial recognition model may be associated with a cluster of face samples.

Figure 4:
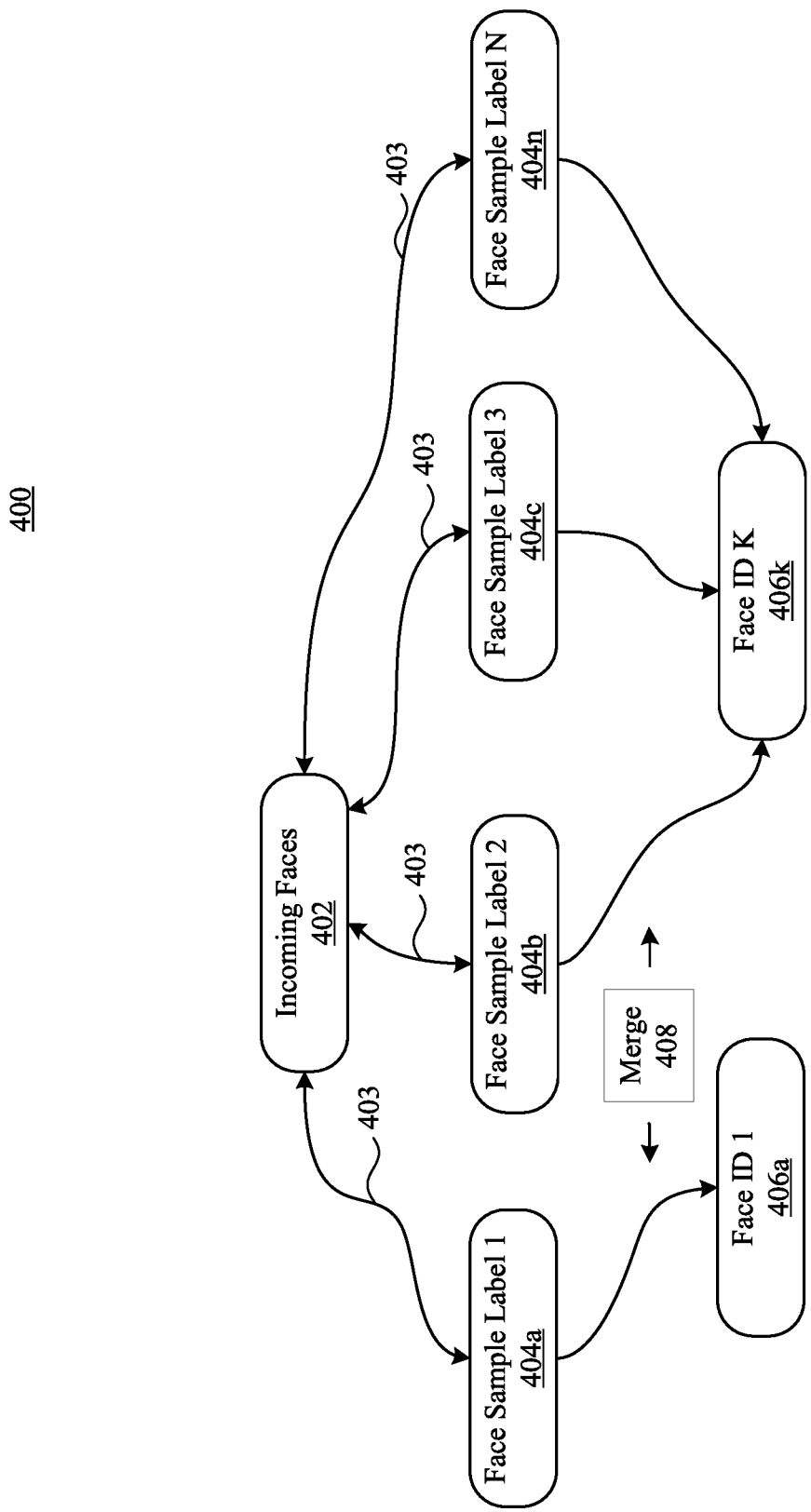
FIG. 4 illustrates an example flowchart of comparing face samples to identify a label corresponding to the face sample.

FIG. 4 illustrates an example flowchart of comparing face samples to identify a label corresponding to the face sample. The process 400 may begin with receiving incoming facial images 402. A camera device may capture images and detect facial images 402 as described herein. In particular embodiments, an active learning algorithm may be applied to the facial image 402. Each of the incoming facial images 402 go through a comparison process 403 with a pool of face samples 404a-404n. As an example and not by way of limitation, the incoming facial image 402 may be user, John, with a beard. Face Sample Label 2 404b, Face Sample Label 3 404c, and Face Sample Label N 404n may be John with a beard in different outfits. The three Face Samples 404b, 404c, and 404n may have the same face identifier K 406k corresponding to John with a beard. Face Sample Label 1 404a may be John with no beard associated with a different face identifier 1 406a because Face Sample Label 1 404a may exceed a threshold distance from the cluster of images 404b-404n corresponding to face identifier K 406k. In particular embodiments, the facial recognition system may query the user to perform a merge function 408 to combine two clusters of face samples. Since each of the images 404 are of John, the user may approve of the request and confirm that the images 404 are of the same person. In particular embodiments, the facial recognition system may build a facial recognition model of the same user incrementally. This may be based on matching new facial images with existing facial recognition models or based on user feedback. If the user confirms a new facial image does belong to an existing cluster of face samples, then the new facial image becomes an additional face sample to the existing cluster of face samples. This may help improve identification of the same person because more face samples as the facial appearance changes over time adds to the cluster of face samples associated with the person improving the correct identification of the person as the person's appearance changes.

Figure 5:
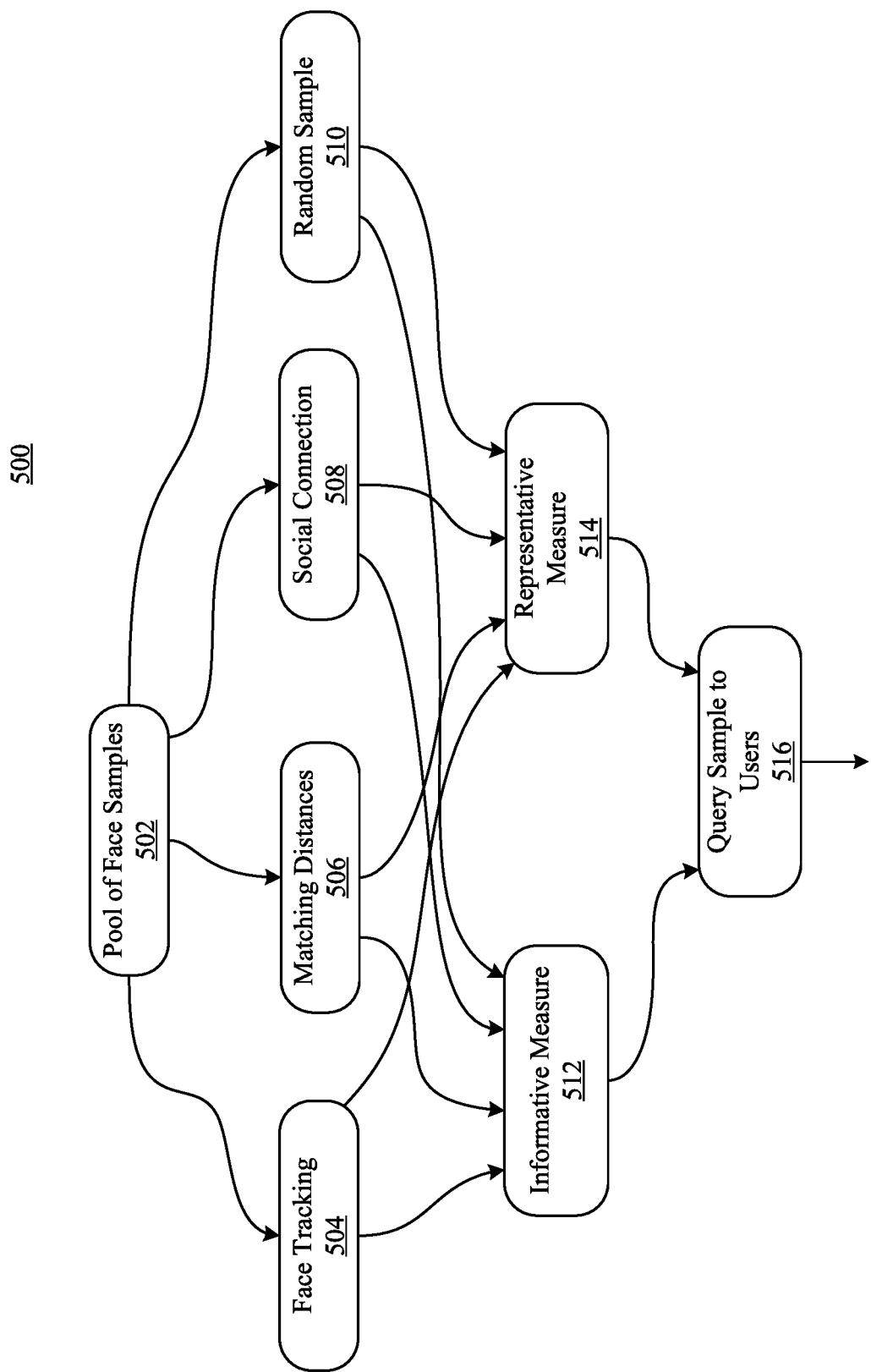
FIG. 5 illustrates an example flowchart of querying users with face samples.

FIG. 5 illustrates an example flowchart of querying users with face samples. In particular embodiments, the facial recognition system may use an active learning algorithm for a process 500 to start matching incoming facial images to existing face samples in an internal pool of face samples 502. In particular embodiments, the pool of face samples 502 may comprise a plurality of facial images associated with their respective facial labels (such as shown in FIG. 4) from previous images captured by the facial recognition system. As an example and not by way of limitation, within a home setting, the pool of face samples 502 may comprise the facial images of the household members and guests that visit the home. However, if the pool of face samples 502 is empty, such as, initially without a known facial recognition model or face sample, then the incoming facial image becomes a face sample. In particular embodiments, the active learning algorithm may learn correspondence between incoming facial images and existing face samples in an internal pool of face samples 502 by modeling a context associated with the facial images. Each of the face samples 502 of the pool may be associated with a context. The context may comprise a plurality of individual presence patterns. The individual presence patterns may comprise a visual consistency, where individual instances in the incoming facial images should be visually similar with one of the gallery instances of the pool of face samples 502 with the same individual label $l_j$. The individual presence patterns comprise a co-presence, where an individual $l_i$ and an individual $l_j$ appear together in a video frame concurrently. The individual presence patterns may comprise a sequential pattern, where an individual $l_i$ appears in a frame b, after an individual $l_i$ appears in a previous frame a, in a sequential order. As an example and not by way of limitation, the sequential order may identify when an individual appears in an image and another individual usually appears after that individual. For instance, when a boy comes home from school, usually his sister follows the boy in a series of images. The individual presence patterns may comprise a presence in scene, where an individual appears in scene S. In particular embodiments, the active learning algorithm may use a deep learning module to incorporate scenes to better predict the presence patterns of the individuals. In particular embodiments, the visual consistency pattern may be associated with matching distances 506. The matching distances 506 may be associated with raw visual matching of each facial image in the pool of face samples 502 to an individual in a database (e.g., database of individuals associated with contexts). In particular embodiments, the social connection 508 may be associated with co-presence pattern. The social connection 508 may be associated with a process of identifying and matching a context associated with a facial image from the pool of face samples 502 to a context in a database (e.g., user context database). In particular embodiments, the face tracking 504 may be associated with the sequential pattern. As an example and not by way of limitation, face tracking 504 may be analyzing a series of images and identifying an individual within one image may be the same individual in a consecutive image (if the facial image is in the same or similar location within the image). In particular embodiments, the active learning algorithm may use one or more of the face tracking 504, matching distances 506, social connection 508, or random sampling 510 to determine whether to query a face sample 516 to the user.

In particular embodiments, if a minimum matching distance 506 between the incoming facial image and existing face samples exceed a threshold, the incoming facial image may become a new face sample in the pool of face samples 502 and assigned a new temporal face identifier. However, if the matching distance 506 between the incoming facial image and existing face samples 502 is within a distance, then the incoming facial image may be placed into the candidate pool of face samples for active learning. The active learning algorithm may select face samples 516 to query the user based on features including but not limited to: the matching distance 506 between face samples in the candidate pool and the face samples in the internal facial recognition model sample pool 502 and the consistency of the face tracking 504 that correlate to some of the face samples. Each face tracking 504 may be a continuous track of a single detected face bounding box through time and space. In particular embodiments, the social connection 508 between socially connected people or people appearing at social events together influences the weight of sampling. As an example and not by way of limitation, if a married couple that have previously been identified by the facial recognition system are attending an event together, then active learning algorithm may increase the weight of sampling facial images corresponding to the married couple because the facial recognition system may be able to accurately identify the two people as corresponding to a first face identifier and a second face identifier that have been previously socially connected 508. In particular embodiments, the active learning algorithm may randomly sampling 510 from different clusters of face samples corresponding to two different face identifiers. The random sampling 510 may be used to identify clusters to be merged. As an example and not by way of limitation, if a man grew a beard and is now being identified as a different individual within the pool of face samples 502 from an instance where that man did not have a beard, then the random sampling 510 would improve the likelihood of combining the two clusters of face samples 502 to represent the one individual. In particular embodiments, the facial recognition system may set a certain percentage of facial images to randomly sample the user as a query sample 516. The facial images to randomly sample may come from facial images scored using $J_{Comb}$ and the facial images not scoring high enough to query the user. As an example and not by way of limitation, the facial recognition system may determine to send 5% (or another set percentage) of random facial images to the user that may not have scored enough to send a query to the user. In particular embodiments, in some scenarios if a user identifies the random facial image originally labeled as user 4 as user 1 from a database, then the facial recognition system may combine the facial images associated with user 1 and user 4.

In particular embodiments, the active learning algorithm may focus on two criteria when selecting query samples 516 to send to the users. In particular embodiments, the criteria may comprise an informativeness measure 512 and a representative measure 514. In particular embodiments, the context may be determined based on an evaluation of informativeness and representativeness of a facial image. After determining which query samples 516 to send to the user, the facial recognition system may send the query samples 516 requesting confirmation of whether the query sample 516 corresponds to a facial recognition model or not. In particular embodiments, the informativeness measure 512 may measure the ability of an instance sample in reducing the uncertainty of a statistical model. The informativeness measure 512 may be associated with a threshold amount of information to determine whether a facial image in an image can be identified from a database. In one implementation, the margin-based algorithm may choose the unlabeled instance $x_s$ closest to the decision boundary, which implies the objective function has a relatively high score, regardless of its class label $l_s$. For example, the margin for a face instance $x_j$ can be computed as:

$$\text{Margin}(x_j) = J_{Comb}(l_{k_1}|x_j, H_{k_1}, S_{k_1}) - J_{Comb}(l_{k_2}|x_j, H_{k_2}, S_{k_2}),$$

assuming:

$$J_{Comb}(l_{k_1}|x_j, H_{k_1}, S_{k_1}) \geq J_{Comb}(l_{k_2}|x_j, H_{k_2}, S_{k_2}) \geq \ldots \geq J_{Comb}(l_{k_e}|x_j, H_{k_e}, S_{k_e}).$$

where:

$$J_{Comb}(L_i|x_j, H_i, S_i) = J_{Vis}(L_i|x_j) + J_{Context}(L_i|H_i, S_i)$$

$J_{Comb}$ may be the cost function of both the combined $J_{Vis}$ cost function of the visual appearance model and $J_{Context}$ cost function of the context model. The margin equation may be used to pose a query sample 516 to the user which may be ambiguous, such as two individuals who may look similar. If scores for a facial image is fairly close for two individuals in the database, then the facial recognition system may send a query sample 516 to determine which of the two individuals the query sample 516 pertains to (or other user if the facial recognition system is incorrect). In particular embodiments, an optimal informative query sample 516 may be chosen as:

$$j_{inf}^* = \underset{1 \leq j \leq N_u}{\arg\min} \text{Margin}(x_j) / J_{Comb}(l_{k_2}|x_j, H_{k_2}, S_{k_2}),$$

where $N_u$ may be the total number of unlabeled instances up until (e.g., all the unlabeled instances so far) the current frame. This function may ensure a small margin and a good matching score J at the same time.

In particular embodiments, the informative measure 512 may reward confusable face samples and send these face samples to the user to query the user. In particular embodiments, the cost function may have face tracking 504, matching distances 506, and social connections 508 components. The social connection component 508 may extract user data information from the user context database. In particular embodiments, with the same matching distances, the active learning algorithm may favor to group together face samples that appeared in the same face tracking 504, and/or compatible with social relations, and assign the relevant face samples with higher weight to query the user. In particular embodiments, the representative measure 514 may measure if the sampled instances represent the overall distribution of the input unlabeled data, so that the query samples 516 will cover the unlabeled data space. In particular embodiments, a label density term may be added to the query sampling function above, and the final sample selection combining both informative and representativeness measures is:

$$j^* = \underset{1 \le j \le N_u}{\operatorname{argmin}} \operatorname{Margin}(x_j) / (J_{Comb}(l_{k_2} | x_j, H_{k_2}, S_{k_2}) P(l_{k_1})),$$

where $P(l_{k_1})$ may be the probability of class label to appear in a video frame, computed from $J_{Comb}$, and normalizing among class labels. In particular embodiments, $P(l_{k_1})$ may be associated with a frequency term to determine how often a person appears in a plurality of images. As an example and not by way of limitation, if a person (facial image) appears in a plurality of images one time, then the facial recognition system may not send a query sample 516 or determine not to send the query sample 516 of an image to ask the user who the person may be. However, if the person appears more frequently, then the frequency term may enforce the facial recognition system to send a query sample 516 to the user to request identification of the user and/or notifying the user of the identified unknown person.

In particular embodiments, the representative measure 514 may reward simpler or fewer groups when proposing query samples 516 to the user. The representative measure 514 may measure face tracking 504, matching distances 506, and social connections 508 at a group level. The representative measure 514 may also sample face samples from different clusters of face samples randomly to propose merging the two clusters together under the same face identifier. In particular embodiments, data may be a stream as a result of the sequential nature of video clips. In particular embodiments, each new video may have limited or no initially labeled facial recognition model. The process may be a cold start process to build a gallery of face samples for facial recognition models. Individual recognition may be based on both visual matching and individual presence patterns. The objective function for face visual matching may be $$J_{Vis}(l_i | x_j) = \max_{y_i \in G_i}(MatchingScore(x_j, y_i)),$$

where $G_i$ may be the set of gallery instances with label $l_i$. $x_j$ may be an individual instance in a video frame, and $y_i$ may be a gallery instance. The gallery instances may be the pool of sample faces 502. $J_{Vis}$ may be used to find the best visual matching score of a facial image identified in an image compared to each facial image in the pool of sample faces 502. The gallery instances may be labeled by pre-clustering and learning. The objective function may be based on context, $J_{Context}$, which may leverage the sequential and co-presence relationships between each individual, and individuals in scenes. In particular, the co-presence objective function may depend on a set of individual labels estimated from a frame, and their co-presence probability. Let:

$$L_i := (l_j)_{j \in I_i}, X_i := (x_j)_{j \in I_i},$$

where $l_j$ may be the individual label of individual instance $x_j$, $I_i$ may be the set of individual instance indexes for frame i. Further, let $h_j$ be the frame number when individual $l_j$ appears in the nearest history, and $$H_i := (h_j)_{j \in I_i},$$

the objective function of individual identification may be defined based on context at frame i as:

$$J_{Context}(L_i | H_i, S_i) = \alpha J_{Co\text{-}Presence}(L_i) + \beta J_{Seq}(L_i | H_i) + \gamma J_{Scene}(L_i | S_i).$$

Where
$$J_{Co\text{-}Presence}(L_i) \propto P_{CP}(L_i),$$
$$J_{Seq}(L_i | H_i) \propto P_{Seq}(L_i | H_i).$$

$\alpha$, $\beta$ and $\gamma$ may be the weights. $P_{CP}(L_i)$ and $P_{Seq}(L_i | H_i)$ may be the probability of individual labels $l_j \in L_i$ to be co-present in a frame, and to appear again based on the history when they appeared in the past, respectively. They may be estimated based on the observations from a video clip.

In particular embodiments, the facial recognition system may extract individuals from videos and build contexts to represent individual presence patterns in order to match with a time-varying co-appearance graph. As an example and not by way of limitation, based on co-appearance graphs involving main characters in a story, the main characters may be matched to individual presence patterns in the videos. These main characters may be identified individuals that appear often within a plurality of images (e.g., a video, a movie, and the like). As an example and not by way of limitation, the main characters may be people that reappear within a plurality of images for a threshold time period. The facial recognition system may build time-varying co-appearance graphs by processing streaming data. The time-varying co-appearance graph may be a representation in view of evolving individual social connections in a sequential order. In particular embodiments, the facial recognition system may generate character grounding to accurately model the characters within a video to have an increased video understanding. The facial recognition system may accurately identify characters within a video despite appearance changes throughout the video (e.g., change of clothing, occluded faces, blurry faces, faces with heavy makeup, and the like). To do so, the facial recognition system may generate a character grounding using the context associated with an individual character. This may be done even without facial images by developing a deep context model for the individual character in connection with other individual characters and/or scenes. In particular embodiments, this may be applied to other settings and be used to identify "main characters" in different environments. As an example and not by way of limitation, an employee may be identified as a main character within a workplace if the person appears frequently in images captured of the workplace while other people appear and disappear from the images captured of the workplace (e.g., temporary employees, delivery people, etc.).

In particular embodiments, the facial recognition system may build and trigger a family context graph. The facial recognition system may initially access a plurality of facial images from one or more devices and send query samples to a user to confirm and/or label each cluster of face samples from the plurality of facial images. The facial recognition system may identify a context of each member of a family.

As an example and not by way of limitation, a husband typically leaves in the early morning and a wife usually leaves during the late morning. In particular embodiments, the facial recognition system may send a face identifier which corresponds to a user identifier to another device. The other device may perform an action in response to receiving the user identifier. As an example and not by way of limitation, when a user identified by face identifier 1 stands in front of a display or mirror coupled to a device that received the face identifier 1 (or a user identifier corresponding to face identifier 1) then the device may retrieve one or more information and/or notifications corresponding to the user identified by face identifier 1. For instance, if the user is the husband, then the user may be presented with an estimated time for the morning commute for his route to work. As another example and not by way of limitation, when a user identified by face identifier 2 stands in front of a display or mirror coupled to a device that received the face identifier 2 (or a user identifier corresponding to face identifier 2) then the device may retrieve one or more information and/or notifications corresponding to the user identified by face identifier 2. Additionally, the display or mirror may interact with the user to actively learn new faces through new facial images. This may be done in order to build face context associations.

In particular embodiments, the facial recognition system can define an appearance frequency objective based on people-scene co-appearance pattern, or people-people co-appearance patterns, so that the facial recognition system may be optimized for detecting unfamiliar faces, in the sense that at any moment, the system objective may be to minimize the false positive of unfamiliar faces and optimize the accuracy of detected unfamiliar faces:

$$J_{facecontext} = w_1 J_{SceneContext} + w_2 J_{PeopleContext}$$

Where $J_{SceneContext}$ may represent the location and scene parameters to be associated with an individual and the $J_{PeopleContext}$ may represent the people associated with an individual. A first weight and a second weight may be applied to each $J_{SceneContext}$ and $J_{PeopleContext}$.

Figure 6:
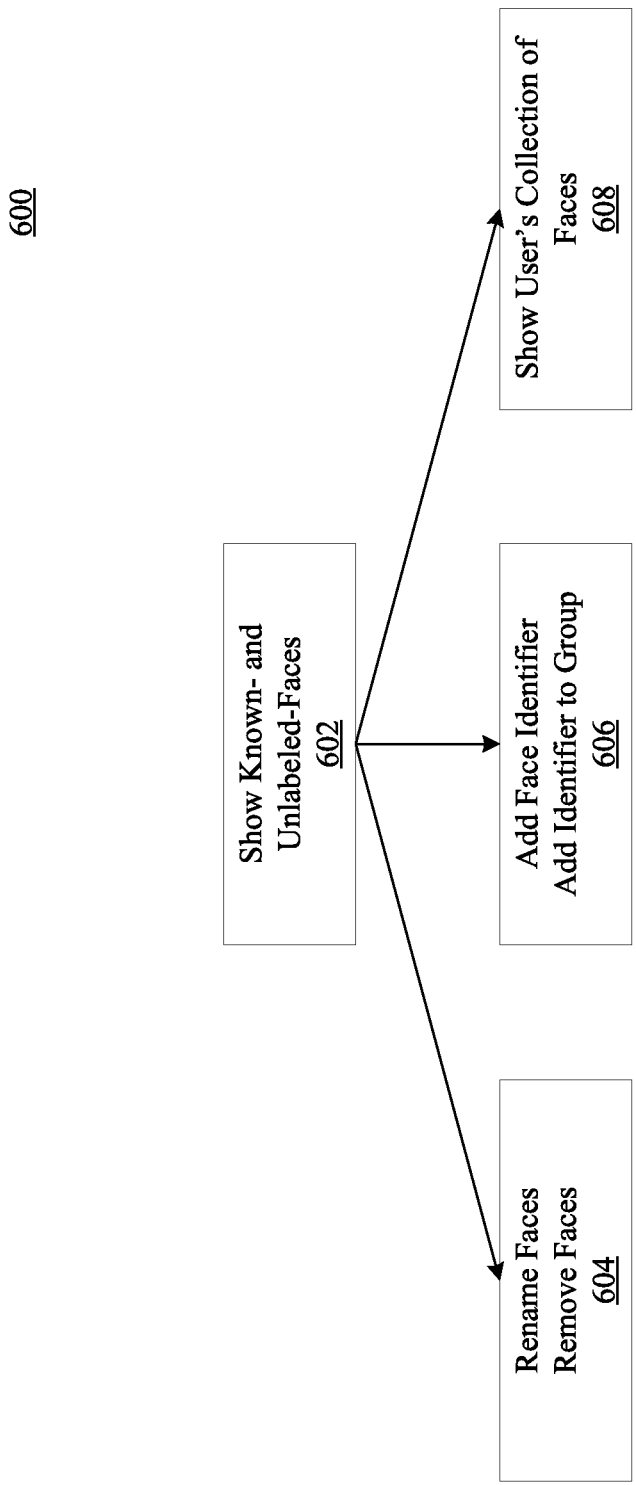
FIG. 6 illustrates an example user interaction with face samples.

FIG. 6 illustrates an example user interaction with face samples. The process 600 may begin with showing known and unlabeled facial images 602 to the user. The user may be presented the known and unlabeled facial images 602 on a user device, such as a smartphone. In particular embodiments, the user may have multimodal user interaction to view the known and unlabeled faces 602. In particular embodiments, the facial recognition system may determine to send query samples to the user as described herein. The query samples may be the known and unlabeled facial images 602. In particular embodiments, the facial recognition system may send the facial images to the user to query the user in response to determining to send query samples. The facial recognition system may show known faces 602 with their exact contexts on an interface (e.g., user device), together with unlabeled faces 602. The provisioning of the context with the known faces 602 may increase the available information for the user to make a decision based on the context. In particular embodiments, the user may perform a renaming of a facial image or removing a facial image 604, adding a face identifier or adding an identifier to a group 606, or request to show a user's collection of facial images 608. The user may rename 604 a known and/or an unlabeled facial image 602 to correct the known and/or unlabeled facial image 602. The user may remove 604 a known and/or an unlabeled facial image 602 for the instances where the facial image 602 is an unfamiliar individual. The user may add a face identifier 606 to an unlabeled facial image 602 where the user knows the individual associated with the unlabeled facial image 602. The user may add an identifier 606 to a group of known and/or unlabeled facial images 602 to create a new cluster or labeling a cluster of face samples. In particular embodiments, the user may request to show the user's collection of facial images 608.

In particular embodiments, the user may be presented a known facial image 602 and request to get a user identifier associated with the known facial image 602. In particular embodiments, the user may send a user input to the facial recognition system via a user device. In particular embodiments, the user device may be a camera device as described herein. The user input may be a text input, a touch input, a gesture, or an audio input. In particular embodiments, the user may use a voice service through an assistant service to tag a user identifier and/or handle a user identifier. As an example and not by way of limitation, a user may be presented an unlabeled facial image 602, and the user may say "this is John" to apply a user identifier associated with "John" to the unlabeled facial image 602. In particular embodiments, the user may confirm or reject the known and/or unlabeled facial images 602 that are being presented to the user.

In particular embodiments, the facial recognition system may request access to an audio input from another device based on privacy settings of the user(s) associated with the facial recognition system. The facial recognition system may use the audio input to generate a voice profile to match to a face identifier. The voice profile may add to the context model associated with the face identifier by enabling the facial recognition system to more accurately identify a person within an image. To do so, the facial recognition system may access a facial image of a person within a scene and determine a 60% facial match score to the nearest cluster of face samples. Additionally, the facial recognition system may access the voice profile associated with the face identifier and/or separately determine the face identifier associated with a retrieved voice profile to identify a person associated with the voice profile and perform a comparison on whether the face identifier associated with the retrieved voice profile matches the face identifier corresponding to the cluster of face samples.

In particular embodiments, the facial recognition system may use cloud computing to sync facial recognition models acquired from mobile devices, workplaces, home environment, so that the facial recognition model in different contexts and places may be shared. The syncing of the facial recognition models may improve upon the accuracy in which the facial recognition system will be able to identify an individual associated with the respective facial recognition model. In particular embodiments, the syncing and sharing of the facial recognition models may be based on privacy settings. The privacy settings may be associated with the user corresponding to the facial recognition model, the user of the user device, and/or both. In particular embodiments, two or more facial recognition models on the same device and/or different devices may be merged in response to determining the two or more facial recognition models correspond to the same individual.

In particular embodiments, the facial recognition system may define objective functions to focus more on scene context, or people context by adjusting or learn weights. $w_1$, $w_2$: $J_{facecontext} = w_1 J_{Scene} + w_2 J_{people}$. In particular embodiments, the user may specify the objective functions in order to reflect their priority scenario for accurate facial recognition and fewer false alarms for unfamiliar faces. As an example and not by way of limitation, the user may turn off the alarms sent to the user. As another example and not by way of limitation, the user may increase the sensitivity of detecting alarms and request to be sent more query samples.

Figure 7:
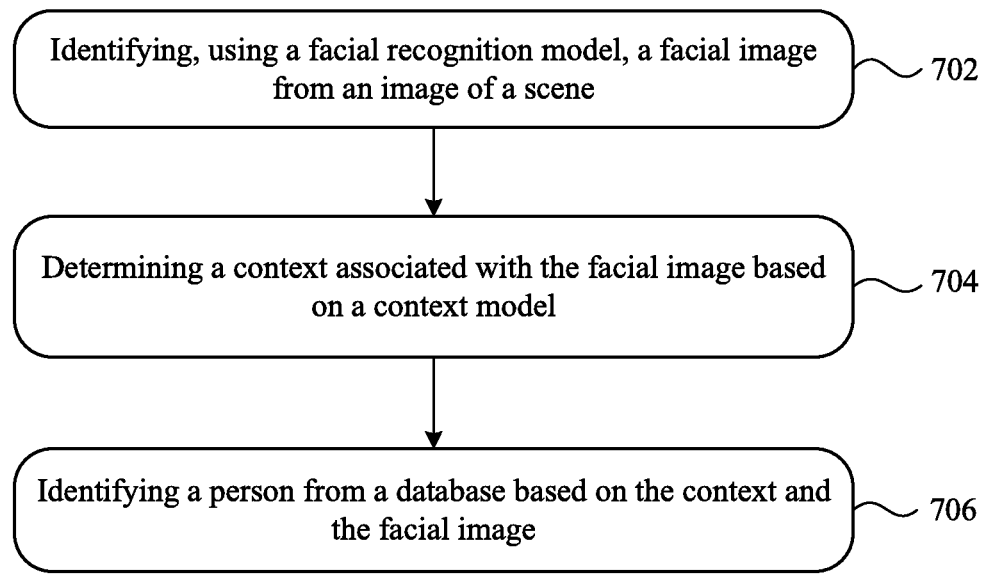
FIG. 7 illustrates an example method of identifying a person through facial recognition and context.

FIG. 7 illustrates an example method for identifying a person through facial recognition and context. At step 702, the method may include identifying, using a facial recognition model, a facial image from an image of a scene. At step 704, the method may include determining a context associated with the facial image based on a context model. At step 706, the method may include identifying a person from a database based on the context and the facial image.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for mapping a user input to a content, this disclosure contemplates any suitable method for mapping a user input to a content, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, the facial recognition system may generate a plurality of context models each corresponding to a face identifier. As an example and not by way of limitation, the facial recognition system may associate a face identifier with one individual person and determine the one or more contexts the individual person has been identified being associated with. For instance, if the person has previously been identified by a facial image within an image playing an instrument, then the person is associated with the context comprising a musical instrument. In particular embodiments, a facial recognition model may be incrementally trained by presenting the facial image to be labelled. The facial image may also be presented with the context (e.g., the person is associated with the context comprising a musical instrument). As another example and not by way of limitation, the person may be a younger brother and generally come through the front door after his older sister after school. As such, the facial recognition system may associate a co-presence pattern with the person to be around his older sister after school. In particular embodiments, when a new individual presence pattern (e.g., visual consistency, co-presence, sequential, or presence in a scene) associated with a context is detected, the facial recognition system may associate the new individual presence pattern with the individual or individuals identified within an image. In particular embodiments, the facial recognition system may incrementally train a facial recognition model associated with an individual by presenting a facial image with information corresponding to the pattern of the people (co-presence pattern). In particular embodiments, the context may comprise a coexistence pattern associated with people or a person and/or a scene. As an example and not by way of limitation, the context may be the same individuals within a same location, such as two people routinely going to a restaurant for lunch during the weekdays. As another example and not by way of limitation, the context may be a user arriving at a location at the same time or similar time during the work week. As another example and not by way of limitation, the context may be a user appears in a series of locations in the same or similar sequence, such as heading to work, then child's school, and then home.

In particular embodiments, the facial recognition system may be used to identify an individual within a photo album search process. As an example and not by way of limitation, the facial recognition system may be able to identify a context associated with a scene of an image and identify facial images of the people within the image. If for instance two brothers typically appear together within a photo album, the facial recognition system may be able to identify the two brothers from a database based on the context and facial images. As an example and not by way of limitation, for a Halloween picture, if one brother has a mask, but the other brother has a different costume on with his face showing, then the facial recognition system may identify both individuals as the correct brother by using the context associated with the people in the image and the scene. In particular embodiments, the facial recognition system may associate particular places with individuals. As an example and not by way of limitation, if an individual is identified at a work environment, the facial recognition system may associate that individual with the work environment (e.g., as an employee). In particular embodiments, the facial recognition system may generate a spatial-co-appearance graph associating certain individuals with certain places. In particular embodiments, when a particular face is identified in a photo album, the facial recognition system may suggest to find relevant photos with other people based on context modeling (e.g., two brothers that usually appear together in photos).

Figure 8:
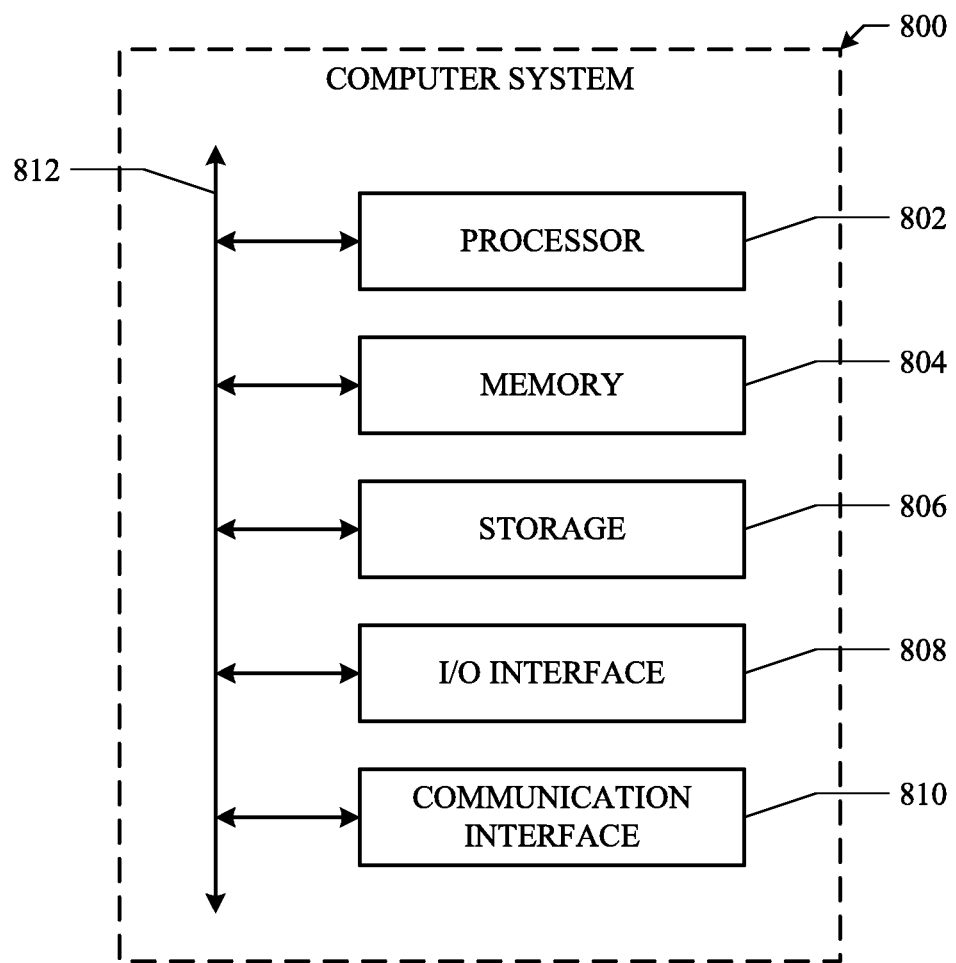
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computer device:
   identifying a facial image from an image of a scene;
   determining a context associated with the facial image based on a context model;
   determining the facial image is an unfamiliar person based on the context and failing to match the facial image to one of a plurality of facial recognition models;
   creating a new face sample group to associate with the facial image and the context; and
   generating a temporary facial identifier to associate with the new face sample group and the context.

2. The method of claim 1, further comprising:
   determining an informativeness and a representativeness of the facial image; and
   presenting the facial image to be labelled for training the facial recognition model.

3. The method of claim 2, wherein presenting the facial image comprises presenting the context associated with the facial image.

4. The method of claim 1, wherein the context comprises at least one of a visual consistency, a sequential order, a presence associated with the scene, or a coexistence pattern associated with the person or the scene.

5. The method of claim 4, wherein the coexistence pattern associated with the person identifies a first person and a second person that have previously been identified together, and wherein the coexistence pattern of the scene comprises a first person identified in the scene and a set of scene parameters.

6. The method of claim 1, wherein:
the scene comprises one or more scene parameters; and
the scene parameters comprise one or more of a time associated with the scene, a date associated with the scene, one or more elements captured within the scene, or an activity associated with the scene.

7. The method of claim 1, further comprising identifying a person from a database based on the face sample group.

8. An apparatus comprising:
a camera; and
one or more non-transitory storage media embodying instructions and one or more processors operable to execute the instructions to:
identify a facial image from an image of a scene;
determine a context associated with the facial image based on a context model;
determine the facial image is an unfamiliar person based on the context and failing to match the facial image to one of a plurality of facial recognition models;
create a new face sample group to associate with the facial image and the context; and
generate a temporary facial identifier to associate with the new face sample group and the context.

9. The apparatus of claim 8, wherein the processors are further operable to execute the instructions to:
determine an informativeness and a representativeness of the facial image; and
present the facial image to be labelled for training the facial recognition model.

10. The apparatus of claim 9, wherein the processors are further operable to execute the instructions to present the context associated with the facial image.

11. The apparatus of claim 8, wherein the context comprises at least one of a visual consistency, a sequential order, a presence associated with the scene, or a coexistence pattern associated with the person or the scene.

12. The apparatus of claim 11, wherein the coexistence pattern associated with the person identifies a first person and a second person that have previously been identified together, and wherein the coexistence pattern of the scene comprises a first person identified in the scene and a set of scene parameters.

13. The apparatus of claim 8, wherein:
the scene comprises one or more scene parameters; and
the scene parameters comprise one or more of a time associated with the scene, a date associated with the scene, one or more elements captured within the scene, or an activity associated with the scene.

14. The apparatus of claim 8, wherein the processors are further operable tp execute the instructions to identify a person from a database based on the face sample group.

15. One or more non-transitory computer-readable storage media embodying instructions that when executed by one or more processors cause the one or more processors to:
identify a facial image from an image of a scene;
determine a context associated with the facial image based on a context model;
determine the facial image is an unfamiliar person based on the context and failing to match the facial image to one of a plurality of facial recognition models;
create a new face sample group to associate with the facial image and the context; and
generate a temporary facial identifier to associate with the new face sample group and the context.

16. The media of claim 15, further embodying instructions that when executed cause the one or more processors to:
determine an informativeness and a representativeness of the facial image; and
present the facial image to be labelled for training the facial recognition model.

17. The media of claim 16, further embodying instructions that when executed cause the one or more processors to present the context associated with the facial image.

18. The media of claim 15, wherein the context comprises at least one of a visual consistency, a sequential order, a presence associated with the scene, or a coexistence pattern associated with the person or the scene.

19. The media of claim 18, wherein the coexistence pattern associated with the person identifies a first person and a second person that have previously been identified together, and wherein the coexistence pattern of the scene comprises a first person identified in the scene and a set of scene parameters.

20. The media of claim 15, wherein:
the scene comprises one or more scene parameters; and
the scene parameters comprise one or more of a time associated with the scene, a date associated with the scene, one or more elements captured within the scene, or an activity associated with the scene.

* * * * *